(12) United States Patent
Cho et al.

(10) Patent No.: US 12,334,270 B2
(45) Date of Patent: Jun. 17, 2025

(54) MULTILAYER ELECTRONIC COMPONENT CONTAINING COATING LAYERS HAVING AN ISLAND REGION

(71) Applicant: SAMSUNG ELECTRO-MECHANICS CO., LTD., Suwon-si (KR)

(72) Inventors: Sung Min Cho, Suwon-si (KR); Jang Yeol Lee, Suwon-si (KR); Ho Phil Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 331 days.

(21) Appl. No.: 17/969,176

(22) Filed: Oct. 19, 2022

(65) Prior Publication Data

US 2023/0207213 A1    Jun. 29, 2023

(30) Foreign Application Priority Data

Dec. 29, 2021    (KR) .................. 10-2021-0191395

(51) Int. Cl.
*H01G 4/30*    (2006.01)
*H01G 4/12*    (2006.01)
*H01G 4/224*    (2006.01)
*H01G 4/232*    (2006.01)

(52) U.S. Cl.
CPC .............. *H01G 4/30* (2013.01); *H01G 4/12* (2013.01); *H01G 4/224* (2013.01); *H01G 4/232* (2013.01)

(58) Field of Classification Search
CPC ........ H01G 4/232; H01G 4/2325; H01G 4/30; H01G 4/224
See application file for complete search history.

(56) References Cited

U.S. PATENT DOCUMENTS

| | | | |
|---|---|---|---|
| 10,395,839 B1* | 8/2019 | Park | H01G 4/232 |
| 11,605,506 B2* | 3/2023 | Yatagawa | H01G 4/008 |
| 2004/0240146 A1 | 12/2004 | Kayatani et al. | |
| 2013/0279072 A1* | 10/2013 | Okamoto | H01G 4/30 |
| | | | 361/301.4 |
| 2016/0024346 A1* | 1/2016 | Inoue | H01G 4/224 |
| | | | 336/200 |
| 2017/0256359 A1* | 9/2017 | Masunari | H01G 4/005 |
| 2019/0103224 A1* | 4/2019 | Han | H01G 4/2325 |
| 2020/0066444 A1 | 2/2020 | Yang et al. | |
| 2020/0234885 A1* | 7/2020 | Yatagawa | H01G 4/30 |
| 2021/0082622 A1* | 3/2021 | Kim | H01G 4/30 |

FOREIGN PATENT DOCUMENTS

| | | |
|---|---|---|
| KR | 10-0610493 B1 | 8/2006 |
| KR | 10-2020-0022268 A | 3/2020 |

* cited by examiner

*Primary Examiner* — David M Sinclair
(74) *Attorney, Agent, or Firm* — Morgan, Lewis & Bockius LLP (57) ABSTRACT

A multilayer electronic component includes a body including a plurality of internal electrodes and a dielectric layer interposed between the plurality of internal electrodes; external electrodes disposed on the body, connected to the plurality of internal electrodes, and including electrode layers and plating layers respectively covering the electrode layers; and coating layers respectively covering the plating layer and including an island region exposing a portion of a surface of the plating layer.

16 Claims, 5 Drawing Sheets

MULTILAYER ELECTRONIC COMPONENT CONTAINING COATING LAYERS HAVING AN ISLAND REGION

CROSS-REFERENCE TO RELATED APPLICATION(S)

This application claims benefit of priority to Korean Patent Application No. 10-2021-0191395 filed on Dec. 29, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, may be a chip-type condenser mounted on a printed circuit board of any of various electronic products, such as an imaging device such as a liquid crystal display (LCD) or a plasma display panel (PDP), a computer, a smartphone or a mobile phone, to serve to charge or discharge electricity therein or therefrom.

The multilayer ceramic capacitor has a small size, implements high capacitance, may be easily mounted on a circuit board, and may thus be used as a component of various electronic devices. There has been increasing demand for the multilayer ceramic capacitor to have a smaller size and higher capacitance as a component of the electronic device has a smaller size.

According to this trend, the multilayer ceramic capacitor may gradually have a smaller size, a dielectric may have a higher effective volume ratio with the same volume in order to implement the higher capacitance at a smaller scale, and an electrode may thus have a smaller thickness. However, as the electrode has the smaller thickness, many problems occur in moisture resistance reliability of the capacitor than before due to moisture infiltration. Therefore, there is not only increasing importance for the moisture resistance reliability, but also required is a more improved specification of the capacitor to implement the moisture resistance reliability.

SUMMARY

An aspect of the present disclosure may provide a multilayer electronic component having improved moisture resistance reliability.

Another aspect of the present disclosure may provide a multilayer electronic component having both improved moisture resistance reliability and improved mountability.

However, the present disclosure is not limited to the description above, and may be more readily understood in the description of exemplary embodiments of the present disclosure.

According to an aspect of the present disclosure, a multilayer electronic component may include: a body including a plurality of internal electrodes and a dielectric layer interposed between the plurality of internal electrodes; external electrodes disposed on the body, connected to the plurality of internal electrodes, and including electrode layers and plating layers respectively covering the electrode layers; and coating layers respectively covering each of the plating layers and including an island region exposing a portion of a surface of the plating layer.

According to another aspect of the present disclosure, a multilayer electronic component may include: a body including a plurality of internal electrodes and a dielectric layer interposed between the plurality of internal electrodes; an external electrode disposed on the body, connected to the plurality of internal electrodes, and including an electrode layer and a plating layer covering the electrode layer; and a first coating layer disposed on the plating layer and not disposed on the body.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, an X-direction may indicate a first or length direction, a Y-direction may indicate a second or width direction, and a Z-direction may indicate a third, thickness or stack direction, and the present disclosure is not limited thereto.

Multilayer Electronic Component

Figure 1:
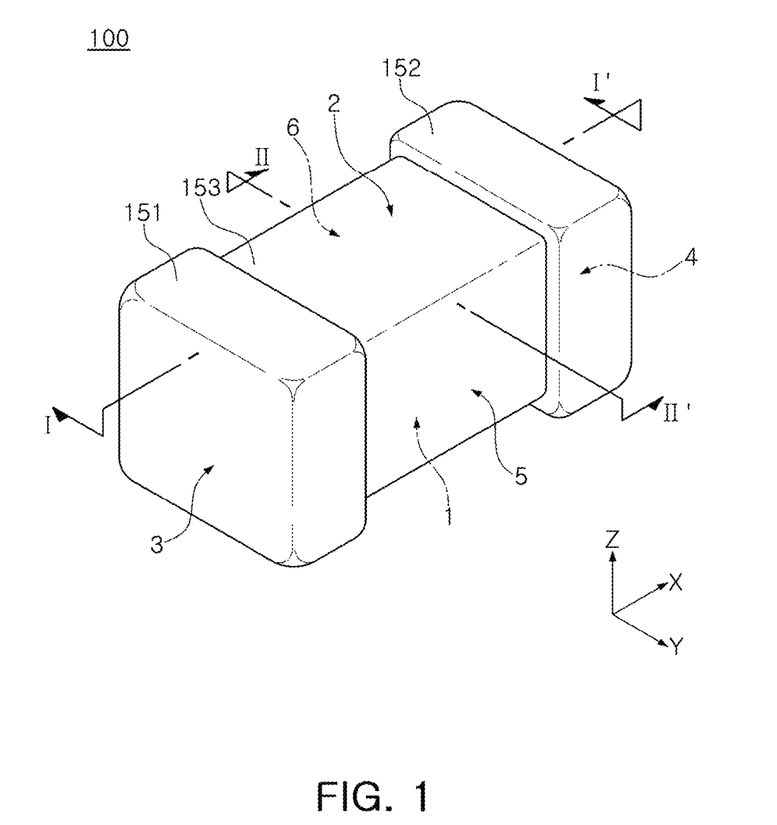
FIG. 1 is a perspective view schematically illustrating a multilayer electronic component according to an exemplary embodiment of the present disclosure.
Figure 2:
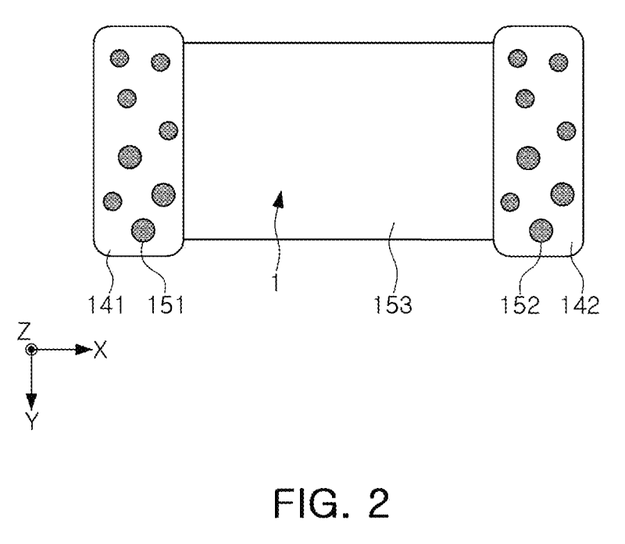
FIG. 2 is a plan view of the multilayer electronic component of FIG. 1 when viewed from a first surface of FIG. 1.
Figure 3:
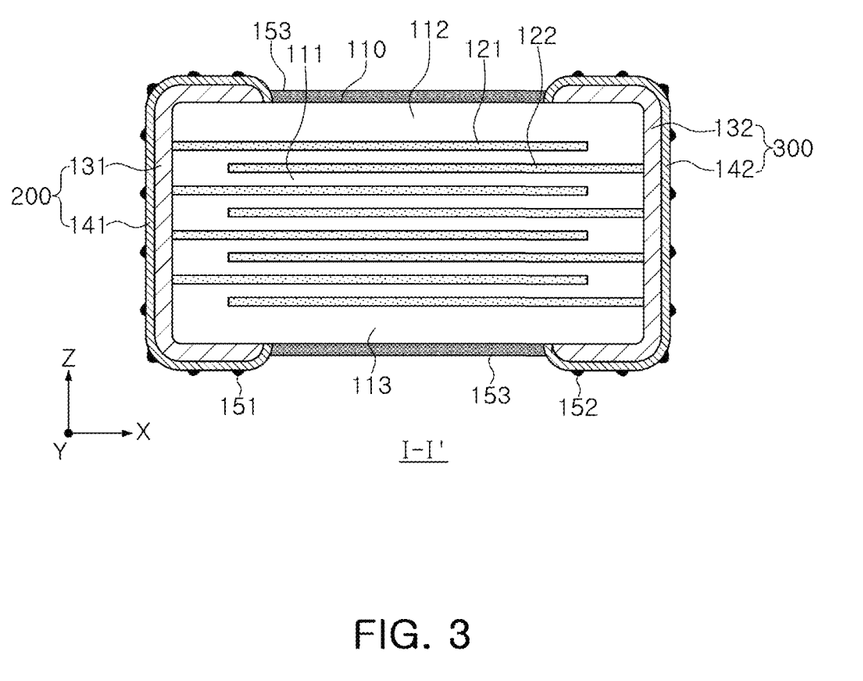
FIG. 3 is a schematic cross-sectional view taken along line I-I' of FIG. 1.
Figure 4:
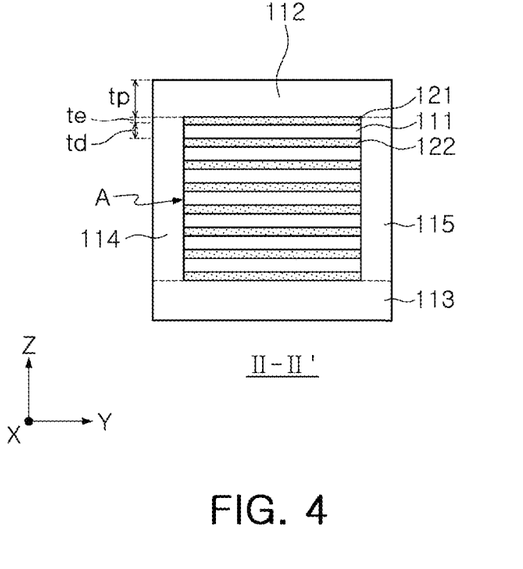
FIG. 4 is a schematic cross-sectional view taken along line II-II' of FIG. 1.
Figure 5:
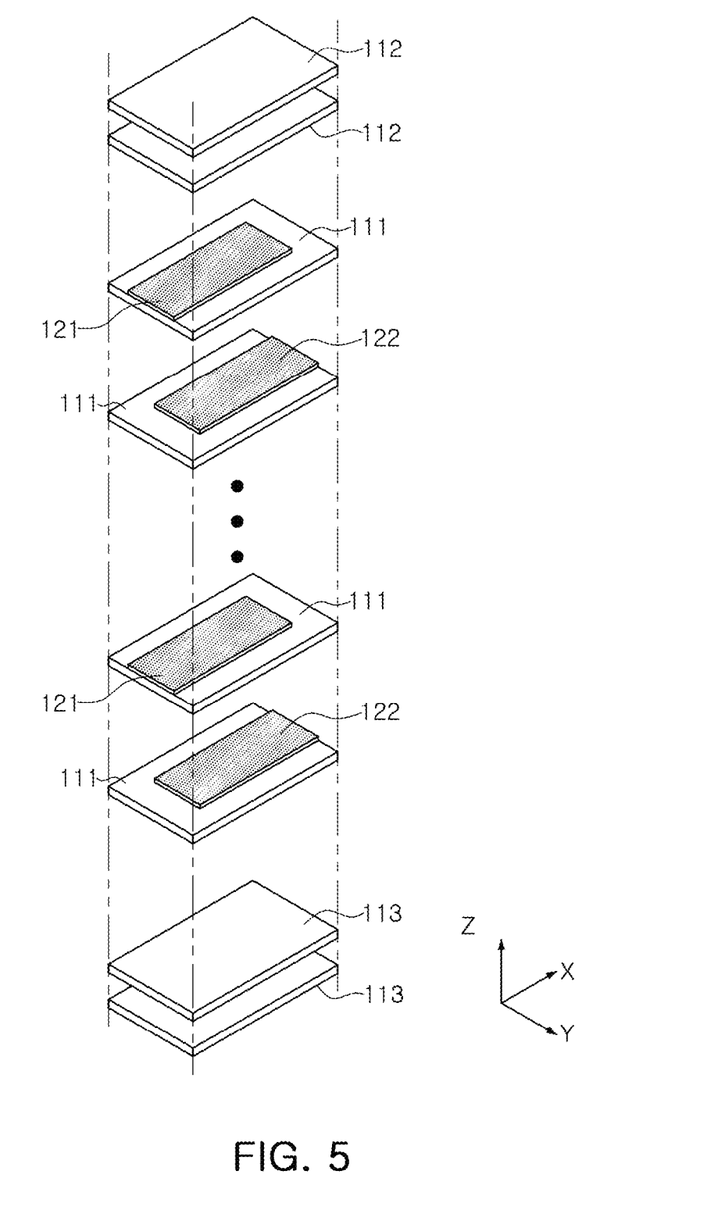
FIG. 5 is an exploded perspective view schematically illustrating an exploded capacitor body in which a dielectric layer and an internal electrode are stacked on each other to manufacture the multilayer electronic component according to an exemplary embodiment of the present disclosure.

FIG. 1 is a perspective view schematically illustrating a multilayer electronic component according to an exemplary embodiment of the present disclosure;

FIG. 2 is a plan view of the multilayer electronic component of FIG. 1 when viewed from a first surface of FIG. 1;

FIG. 3 is a schematic cross-sectional view taken along line I-I' of FIG. 1;

FIG. 4 is a schematic cross-sectional view taken along line II-II' of FIG. 1; and FIG. 5 is an exploded perspective view schematically illustrating an exploded capacitor body in which a dielectric layer and an internal electrode are stacked on each other according to an exemplary embodiment of the present disclosure.

Hereinafter, the multilayer electronic component according to an exemplary embodiment of the present disclosure is described with reference to FIGS. 1 through 4.

A multilayer electronic component 100 according to an exemplary embodiment of the present disclosure may include: a body 110 including a plurality of internal electrodes 121 and 122 and a dielectric layer 111 disposed between the plurality of internal electrodes; external electrodes disposed on the body, connected to the plurality of internal electrodes, and including electrode layers 131 and 132 and plating layers 141 and 142 respectively covering the electrode layers; and coating layers 151 and 152 respectively covering the plating layer and including an island region exposing a portion of a surface of the plating layer.

The body 110 may include the plurality of internal electrodes 121 and 122 and the dielectric layer 111 disposed between the plurality of internal electrodes. In the body, the dielectric layer 111 and the internal electrode 121 or 122 may be alternately stacked on each other.

The body 110 is not limited to a particular shape, and may have a hexahedral shape or a shape similar to the hexahedral shape, as shown in the drawings. The body 110 may not have the shape of a hexahedron having perfectly straight lines because a ceramic powder included in the body 110 is contracted in a process in which the body is sintered. However, the body 110 may have a substantially hexahedral shape.

The body 110 may have first and second surfaces 1 and 2 opposing each other in the thickness direction (or the Z-direction), third and fourth surfaces 3 and 4 connected to the first and second surfaces 1 and 2 and opposing each other in the length direction (or the X-direction), and fifth and sixth surfaces 5 and 6 connected to the first and second surfaces 1 and 2, connected to the third and fourth surfaces 3 and 4, and opposing each other in the width direction (or the Y-direction).

The plurality of dielectric layers 111 configuring the body 110 may already be sintered, and adjacent dielectric layers 111 may thus be integrated with each other, thus making it difficult to confirm a boundary therebetween without using a scanning electron microscope (SEM).

According to an exemplary embodiment of the present disclosure, a raw material used for forming the dielectric layer 111 is not particularly limited as long as the capacitor obtains sufficient capacitance from the raw material. For example, the dielectric layer may use a material such as a barium titanate-based material, a lead composite perovskite-based material or a strontium titanate-based material. The barium titanate-based material may include the barium titanate ($BaTiO_3$)-based ceramic powder, and this ceramic powder may be, for example, $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr) or the like is partially dissolved in $BaTiO_3$.

The raw material of the dielectric layer 111 may be prepared by adding various ceramic additives, organic solvents, binders, dispersing agents and the like, to a powder such as the barium titanate ($BaTiO_3$) powder, based on an object of the present disclosure.

The internal electrode 121 or 122 may be alternately disposed with the dielectric layer 111 in the thickness direction (or the Z-direction). The internal electrodes may include the first internal electrode 121 and the second internal electrode 122. The first and second internal electrodes 121 and 122 may be alternately disposed to oppose each other interposing the dielectric layer 111 configuring the body 110 therebetween, and may respectively be exposed to the third and fourth surfaces 3 and 4 of the body 110.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4.

That is, the first and second internal electrodes 121 and 122 may be alternately exposed to the third surface 3 and the fourth surface 4 which are both cross sections of the body in the length direction (or the X-direction), and thus respectively be exposed to the first and second external electrodes 200 and 300. The first internal electrode 121 may not be connected to the second external electrode 300 and connected to the first external electrode 200, and the second internal electrode 122 may not be connected to the first external electrode 200 and connected to the second external electrode 300. Accordingly, the first internal electrode 121 may be spaced apart from the fourth surface 4 by a predetermined distance, and the second internal electrode 122 may be spaced apart from the third surface 3 by the predetermined distance.

Here, the first and second internal electrodes 121 and 122 may be electrically insulated from each other by the dielectric layer 111 interposed therebetween.

A material forming each of the first and second internal electrodes 121 and 122 is not particularly limited, and may be a conductive paste formed of one or more of, for example, a noble metal material such as palladium (Pd), a palladium-silver (Pd—Ag) alloy or the like, nickel (Ni) or copper (Cu).

A method of printing the conductive paste may be a screen printing method, a gravure printing method or the like, and the present disclosure is not limited thereto.

Referring to FIG. 5, the body 110 may be formed by alternately stacking a ceramic green sheet on which the first internal electrode 121 is printed and a ceramic green sheet on which the second internal electrode 122 is printed on each other and then sintering the same.

Meanwhile, an average thickness to of the internal electrode 121 or 122 may not need to be particularly limited. However, the average thickness te of the internal electrode 121 or 122 may be in a range of 100 nm to 1.5 μm in order for the multilayer electronic component to have a smaller size and higher capacitance.

The average thickness te of the internal electrode 121 or 122 may be measured by scanning an image of the cross section of the body 110 in a length-thickness (L-T) direction by using the scanning electron microscope (SEM).

For example, an average thickness value of the internal electrode may be measured by extracting any first or second internal electrode 121 or 122 from the scanned image of the cross section of the body 110 cut in the X-Z-direction (or the length-thickness direction) with respect to a center of the body in the Y-direction (or the width direction), by using the scanning electron microscope (SEM), and then measuring a thickness of the corresponding internal electrode at thirty equally spaced points in the length direction.

The body 110 may include a capacitance formation portion A disposed in the body 110, including the first and second internal electrodes 121 and 122 disposed to oppose each other interposing the dielectric layer 111 therebetween, and forming capacitance of the capacitor, and cover portions 112 and 113 disposed on the upper and lower portions of the capacitance formation portion A.

In addition, the capacitance formation portion A may be a portion contributing to the capacitance formation of the capacitor, and may be formed by repeatedly stacking the plurality of first and second internal electrodes 121 and 122 having the dielectric layer 111 interposed therebetween.

The upper cover portion 112 and the lower cover portion 113 may be formed by stacking one dielectric layer or two or more dielectric layers on the upper and lower surfaces of the capacitance formation portion A in the thickness direction, respectively, and may basically serve to prevent damage to the internal electrodes, caused by the physical or chemical stress.

The upper and lower cover portions 112 and 113 may include no internal electrode and may include the same material as the dielectric layer 111.

That is, the upper and lower cover portions 112 and 113 may include a ceramic material such as a barium titanate ($BaTiO_3$)-based ceramic material.

Meanwhile, a thickness of the cover portion 112 or 113 may not need to be particularly limited. However, 20 μm or less may be a range of a thickness tp of the cover portion 112 or 113 in order for the multilayer electronic component to easily achieve the smaller size and the higher capacitance.

In addition, margin portions 114 and 115 may each be disposed on a side of the capacitance formation portion A.

The margin portions 114 and 115 may include the margin portion 114 disposed on the sixth surface 6 of the body 110 and the margin portion 115 disposed on the fifth surface 5 of the body 110. That is, the margin portions 114 and 115 may be disposed on both sides of the ceramic body 110 in the width direction.

As shown in FIG. 3, the margin portions 114 and 115 may indicate a region between both ends of the first and second internal electrodes 121 and 122 and a boundary surface of the body 110 based on a cross section of the body 110 cut in a width-thickness (W-T) direction.

The margin portions 114 and 115 may basically serve to prevent the damage to the internal electrode, caused by the physical or chemical stress.

The margin portions 114 and 115 may be formed by forming the internal electrode by applying a conductive paste on a ceramic green sheet except its portion where the margin portion is to be positioned.

Alternatively, in order to suppress a step difference occurring due to the internal electrodes 121 and 122, the margin portions 114 and 115 may be formed by stacking the internal electrodes on each other, then cutting the internal electrodes to be exposed to the fifth and sixth surfaces 5 and 6 of the body, and then stacking one dielectric layer or two or more dielectric layers on the both sides of the capacitance formation portion A in the width direction.

The external electrodes 200 and 300 may be disposed on the body 110 and may respectively be connected to the internal electrodes 121 and 122.

As shown in FIG. 3, the capacitor may include the first and second external electrodes 200 and 300 respectively disposed on the third and fourth surfaces 3 and 4 of the body 110, and respectively connected to the first and second internal electrodes 121 and 122.

This exemplary embodiment describes that the multilayer electronic component 100 includes two external electrodes 200 and 300. However, the number, shapes or the like of the external electrodes 200 and 300 may each depend on shapes of the internal electrodes 121 and 122 or another purpose.

Meanwhile, the external electrode 200 or 300 may be made of any material having electrical conductivity, such as a metal, may use a specific material determined in consideration of electrical characteristics, structural stability or the like, and may have a multilayer structure.

For example, the external electrode 200 or 300 may include the electrode layer 131 or 132 disposed on the body 110 and the plating layer 141 or 142 formed on the electrode layer 131 or 132. That is, the electrode layer 131 or 132 may include a conductive metal and glass. In detail, the electrode layer 131 or 132 may be a fired electrode including the conductive metal and glass, or a resin-based electrode including the conductive metal and a resin.

In addition, the electrode layer 131 or 132 may be made by sequentially forming the fired electrode and the resin-based electrode on the body. In addition, the electrode layer 131 or 132 may be formed by transferring a sheet including the conductive metal to the body or by transferring the sheet including the conductive metal to the fired electrode.

The conductive metal included in the electrode layer 131 or 132 may use a material having excellent electrical conductivity, and is not particularly limited. For example, the conductive metal may be at least one of nickel (Ni), copper (Cu) and alloys thereof.

The plating layer 141 or 142 may serve to improve mountability of the multilayer electronic component. The plating layer 141 or 142 is not limited to a particular type, may include at least one of nickel (Ni), tin (Sn), palladium (Pd) and alloys thereof, or may include a plurality of layers.

For a more specific example, the plating layer 141 or 142 may be a nickel (Ni) plating layer or a tin (Sn) plating layer, and in particular, may be the tin (Sn) plating layer. Alternatively, the plating layer 141 or 142 may be formed by sequentially forming the nickel (Ni) plating layer and the tin (Sn) plating layer on the electrode layer 131 or 132, or by sequentially forming the tin (Sn) plating layer, the nickel (Ni) plating layer and the tin (Sn) plating layer on the electrode layer 131 or 132. In addition, the plating layer 141 or 142 may include the plurality of nickel (Ni) plating layers and/or the plurality of tin (Sn) plating layers.

In related art, as the external electrode has the smaller thickness in order for the multilayer ceramic capacitor to have the smaller size and the higher capacitance, the capacitor may have lower moisture resistance reliability due to moisture infiltration or the like. For this reason, a recently emerging problem is that the capacitor has low mountability and reliability due to a defect in an electrode terminal. That is, a defect in which a lower external electrode and the plating layer are cut off may occur because the lower external electrode fails to completely cover the body before performing plating, which may cause a poor electrode terminal. This lower density of the electrode terminal may allow a path through which external moisture infiltrates into the capacitor. Moisture infiltrating into the capacitor may cause an electrochemical reaction at an interface between the internal electrode and the dielectric layer while a product is operated, thus inducing an internal defect, which leads to poor moisture resistance reliability of the product.

Accordingly, there are various attempts made to improve the moisture resistance reliability of the capacitor and block the path through which the moisture infiltrates into the capacitor. For example, developed in the related art is technology for coating the interface between the external electrode and the body by impregnating an organic material or the like. That is, as a method of blocking the path of moisture by applying an organic coating after performing the plating, polydimethylsiloxane (PDMS) and an organic silicon (Si) material may be coated on the interface between the external electrode and the ceramic body after performing the plating.

However, heterogeneous water-repellent organic materials present on the surface of the ceramic body may easily induce static electricity due to a charging phenomenon that occurs between an external contact material and these materials, and a defect such as a mounting misalignment of the capacitor may thus occur when a part is used. In addition, when the organic materials are present on an outermost of the plating layer, there may be little solder paste and wetting when mounting the capacitor, and a reflow defect may thus occur during the mounting.

Accordingly, the present inventors repeat intensive research to provide a multilayer electronic component having improved moisture resistance reliability and simultaneously having excellent mountability, while solving the above-described problem of the related art. As a result, the present inventors find that it is possible to provide a multilayer electronic component having an improved moisture infiltration control by applying an inorganic coating rather than an organic coating as an insulation coating, and simultaneously, having no problem in its mountability by removing the insulation coating formed on a soldering portion, while having an improved sealing property by coating an entire capacitor except for its mounting area.

In detail, the present inventors confirm that the above-described object may be achieved when the capacitor includes the coating layer 151 or 152 covering the plating layer 141 or 142, and the coating layer 151 or 152 includes an island region exposing a portion of the surface of the plating layer 141 or 142, as shown in FIG. 3. That is, according to the present disclosure, it is possible to solve a mounting defect of the capacitor by controlling the coating layer 151 or 152 to include the island region by selectively removing a portion of the insulation coating from the soldering portion while allowing the capacitor to secure the moisture resistance reliability by applying the insulation coating using a below-described inorganic material suppressing the moisture infiltration. In some embodiments, the coating layer 151 or 152 may be the first coating layer.

Accordingly, the coating layer 151 or 152 including the island region may cover a portion of the plating layer 141 or 142, thereby functioning as moisture infiltration suppression. Simultaneously, the coating layer 151 or 152 may include the island regions, and it is thus possible to secure even the mountability of the capacitor by exposing a portion of the surface of the plating layer 141 or 142.

Meanwhile, although the present disclosure is not particularly limited, as a result of additional research, the present inventors find that it may contribute to securing the excellent moisture resistance reliability and mountability of the capacitor by controlling a ratio of an area of a remaining coating layer due to the selective removal of the insulation coating from the above-described soldering portion and a ratio of an area of the exposed surface of the plating layer to an appropriate range.

In detail, according to an exemplary embodiment of the present disclosure, 0.1 to 10% may be a range of the ratio of the area of the coating layer 151 or 152, which is a ratio of a region where the coating layer is formed on the surface of the plating layer. The present inventors find that in order to secure the mountability of the capacitor in particular, it is important to control the ratio of the area of the coating layer remaining in the soldering portion. That is, when less than 0.1% is a range of the ratio of the area of the coating layer 151 or 152, the capacitor may have insufficient moisture resistance reliability. On the other hand, when more than 10% is a range of the ratio of the area of the coating layer 151 or 152, the capacitor may have insufficient mountability due to a problem occurring in its adhesion strength or solderability even if the capacitor may secure the moisture resistance reliability at a desired level.

Here, a method of measuring the ratio of the area of the coating layer 151 or 152 is not particularly limited. However, this ratio may be obtained by observing the external electrode 200 or 300, included in the soldering portion, by using the scanning electron microscope (SEM) and then measuring the ratio of the area of the remaining coating layer 151 or 152 to a total area of the surface of the plating layer 141 or 142.

In addition, according to an exemplary embodiment of the present disclosure, it may be necessary to secure the area of the exposed surface of the plating layer at a predetermined ratio to prevent a problem that the capacitor slips from a board when the capacitor is mounted on the board and reflowed, for example. Accordingly, 90 to 99.9% may be a range of the ratio of the area of the exposed surface of the plating layer. When less than 90% is a range of the ratio of the area of the exposed surface of the plating layer, the capacitor may have the insufficient mountability due to a problem occurring in its adhesion strength or solderability even if the capacitor may secure the moisture resistance reliability. On the other hand, more than 99.9% is a range of the ratio of the area of the exposed surface of the plating layer, the capacitor may have moisture resistance reliability due to a problem occurring in its adhesion strength or solderability even if the capacitor may secure the mountability.

A method of measuring the ratio of the area of the exposed surface of the plating layer may not particularly limited either. However, for example, like the method of measuring the ratio of the area of the coating layer 151 or 152, this ratio may be obtained by observing the external electrode 200 or 300, included in the soldering portion, by using the scanning electron microscope (SEM) and then measuring the ratio of the area of the exposed surface of the plating layer to a total area of the plating layer 141 or 142. Here, the area of the exposed surface of the plating layer may be an area excluding the area of the coating layer among the entire area of the surface of the plating layer.

As described above, when the coating layer 151 or 152 is formed using the organic materials, the mounting defect of the capacitor may occur due to the organic materials present on the surface of the ceramic body. The coating layer according to an exemplary embodiment of the present disclosure may thus be an inorganic coating layer formed of the inorganic material. That is, the related impregnation method using the organic material may fill some gaps when the interface between the capacitor body and the external electrode is delaminated. However, when the gap is thin, it may be difficult for the organic material to infiltrate deeply into the gap, and an internal pore may thus remain in the external electrode. Therefore, in the present disclosure, the inorganic material may be used as a material for the coating layer to improve the problem of wetting with solder while effectively preventing the moisture infiltration.

According to an exemplary embodiment of the present disclosure, a coating layer 151 or 152 may be formed by forming a deposition layer of the inorganic material by using an atomic layer deposition (ALD) method, a molecular layer deposition (MLD) method, a chemical vapor deposition (CVD) method, a sputtering method or the like, and then selectively removing only a portion of the deposition layer covering the plating layer by using a laser etching method using masking, a chemical etching method, a physical etching method, wet and polishing method (including ultrasonic method).

Meanwhile, according to an exemplary embodiment of the present disclosure, the coating layer 151 or 152 may include at least one material selected from the group consisting of aluminum oxide, hafnium oxide, silicon oxide, titanium oxide, zirconium oxide and tin oxide.

According to an exemplary embodiment of the present disclosure, the coating layer may have a single-layer structure, or a multi-layer structure in order to maximize the improved moisture infiltration control. When having the multi-layer structure, the coating layer may achieve more improved moisture resistance reliability at the same thickness than having the single-layer structure.

Meanwhile, as an example in which the coating layer has the multi-layer structure, the coating layer may include a first coating layer in direct contact with the plating layer; and a second coating layer formed on the first coating layer. Here, the first coating layer or the second coating layer may include at least one material selected from the group consisting of aluminum oxide, hafnium oxide, silicon oxide, titanium oxide, zirconium oxide and tin oxide, and the second coating layer may include a material not included in the first coating layer. As such, when the coating layer has the multilayer structure, the layers may be distinguished from each other by including one or more different components.

According to an exemplary embodiment of the present disclosure, 30 nm to 0.2 μm may be a range of a thickness of the coating layer. When the coating layer has an excessively smaller thickness, the capacitor may have insufficiently improved moisture resistance reliability, whereas the coating layer has a excessively greater thickness, the capacitor may have a risk of the mounting defect due to the thick coating layer even though the capacitor may have the improved moisture resistance reliability. Therefore, in the present disclosure, 30 nm to 0.2 μm may be an appropriately adjusted range of the thickness of the coating layer. The thickness of the coating layer may be measured by, for example, a scanning electron microscope or a transmission electron microscope. Other methods and/or tools appreciated by one of ordinary skill in the art, even if not described in the present disclosure, may also be used.

According to an exemplary embodiment of the present disclosure, 0.5 μm to 5 μm may be a range of an average diameter of the island region. When less than 0.5 μm is a range of the average diameter of the island region, the capacitor may have the insufficient moisture resistance reliability secured by the coating layer. On the other hand, when more than 5 μm is a range of the average diameter of the island region, the capacitor may have the insufficient mountability due to excessively large influence of the coating layer present on the soldering portion.

Meanwhile, the average diameter of the island region may be obtained by measuring the average diameter of the island region, based on a surface of the multilayer electronic component captured using the scanning electron microscope (SEM) so that the length-width (L-W) surface, length-thickness (L-T) surface or width-thickness (W-T) surface of the coating layer 151 or 152 is observed. Here, the average diameter of the island region may indicate an average value of diameter corresponding to an ideal circle assuming the circle having the same area as each island region.

In addition, according to an exemplary embodiment of the present disclosure, the island regions may include the plurality of island regions, and 5 to 10 μm may be a range of a shortest distance between the plurality of island regions. It is possible to control the capacitor to secure the moisture resistance reliability and the mountability by adjusting the shortest distance between the plurality of island regions, each of which is an index indicating the remaining coating layer compared to the surface of the plating layer, to an appropriate range.

The shortest distance between the plurality of island regions may be obtained by measuring the shortest distance between two adjacent island regions among the plurality of island regions observed to have a separate shape, based on the surface of the multilayer electronic component captured using the scanning electron microscope (SEM) so that the length-width (L-W) surface, length-thickness (L-T) surface or width-thickness (W-T) surface of the coating layer is observed.

According to an exemplary embodiment of the present disclosure, the capacitor may further include an additional coating layer 153 (e.g., a second coating layer) disposed on a region of the body, in which the external electrode is not disposed. Here, the additional coating layer 153 may cover an entire surface of the region of the body, in which the external electrode is not disposed. The capacitor may further include the additional coating layer because the above-described coating layer is formed by forming the deposition layer of the inorganic material, and then selectively removing only a portion of the deposition layer covering the plating layer. Here, the deposition layer is not removed from the region of the body, in which the external electrode (or the plating layer) is not disposed, and the additional coating layer may thus be formed to cover the entire surface of the corresponding region. As such, it is possible for the capacitor to secure the moisture resistance reliability by allowing the additional coating layer 153 to cover the entire surface of the region of the body, in which the external electrode is not disposed. Here, with respect to the component and thickness of the additional coating layer 153, the description of the coating layer 151 or 152 described above may be equally applicable except that the additional coating layer 153 includes no island region. In some embodiments, the first and second coating layers may not directly contact each other.

The multilayer electronic component 100 may not need to be limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 100 having a size of 0402 (i.e. length×width of 0.4 mm×0.2 mm) or less may thus have more remarkably improved reliability according to the present disclosure.

Therefore, in consideration of a manufacturing error, a size of the external electrode and the like, when having the length of 0.44 mm or less and the width of 0.22 mm or less, the multilayer electronic component 100 may have the more remarkably improved reliability according to the present disclosure. Here, the length of the multilayer electronic component 100 may indicate a maximum size of the multilayer electronic component 100 in the second direction, and the width of the multilayer electronic component 100 may indicate a maximum size of the multilayer electronic component 100 in the third direction.

Hereinafter, the present disclosure is described in more detail based on an example. However, it needs to be noted that the following example is provided only to explain the present disclosure by way of example, and not to limit a scope of the present disclosure. The reason is that the scope of the present disclosure is determined by a matter described in the claims and a matter reasonably inferred therefrom.

Example

A ceramic paste is formed using a dielectric ceramic raw material, and a ceramic green sheet is formed on a polyethylene terephthalate (PET) film using the ceramic paste. A green chip is formed by printing nickel (Ni) paste for an internal electrode on the ceramic green sheet, alternately stacking the ceramic green sheets on each other as shown in FIG. 5, firing the same at a predetermined temperature to form the body having the dielectric layer and the internal electrode. Next, a copper (Cu) electrode is formed on a cross section of the body, where the internal electrode is exposed, and an external electrode is then formed by performing tin (Sn) wet plating to manufacture a capacitor element.

A coating layer formed of an aluminum oxide ($Al_2O_3$) material is formed on the entire surface of the capacitor element by using the atomic layer deposition method, and then wet polished at an intensity of 30 Hz for 1 hour to selectively remove only a portion of the deposition layer covering the tin (Sn) plating layer. Next, each sample is prepared by controlling the ratio of the area of the coating layer and the ratio of the area of the exposed surface of the plating layer as shown in Table 1 below to include the island region exposing a portion of the surface of the plating layer. The ratio of the area of the coating layer and the ratio of the area of the exposed surface of the plating layer for each sample are measured by using the same method as the method described above, based on the surface of the multilayer electronic component captured using the scanning electron microscope (SEM) so that the length-width (L-W) surface, length-thickness (L-T) surface or width-thickness (W-T) surface of the soldering portion is observed.

The adhesion strength, solderability and moisture resistance reliability of each sample capacitor are then evaluated by using a method described below.

Adhesion Strength

The adhesion strength is measured by using a solder ball shear method as a method to evaluate adhesion between the solder and the board and adhesion between the solder and the plating layer, and evaluated according to the following standard.

OK: 250 Min Force (gf.) or more

NG: less than 250 Min Force (gf.)

Solderability

The solderability is determined by using a solder bath dipping soldering inspection method, and evaluated based on whether an electrode head is covered with lead after dipping the sample capacitor in flux, then dipping the capacitor in the solder bath, and then soldering the capacitor. The solderability is measured based on an exposure frequency of copper (Cu) after the capacitor is soldered, and evaluated according to the following standard.

OK: 100 ppm or less

NG: more than 100 ppm

Moisture Resistance Reliability

The moisture resistance reliability is measured under a condition of $IR(\Omega)<10^{\wedge}4$ after 2 hr and an atmosphere of 85% shipment reliability, and evaluated according to the following standard.

OK: $IR>10^4$ ($\Omega$)

NG: $IR<10^4$ ($\Omega$)

TABLE 1

| Test No. | Ratio (%) of area of Exposed surface of plating layer | Ratio (%) of area of coating layer | Adhesion strength determined | Solderability determined | Moisture resistance reliability determined |
|---|---|---|---|---|---|
| 1 | Uncoated product (0%) | Uncoated product (0%) | OK(300 Min Force (gf.)) | OK | NG |
| 2 | 99.9% | 0.1% | OK (300 Min Force (gf.)) | OK | OK |
| 3 | 95% | 5% | OK(300 Min Force (gf.)) | OK | OK |
| 4 | 90% | 10% | OK(300 Min Force (gf.)) | OK | OK |
| 5 | 89% | 11% | NG | OK | OK |
| 6 | 75% | 25% | OK (250 Min Force (gf.)) | NG (500 ppm) | OK |
| 7 | 50% | 50% | NG(100 Min Force (gf.)) | NG (5000 ppm) | OK |
| 8 | 0% | 100% | Non-measurable | Non-measurable | Non-measurable |

As may be seen from experimental results in Table 1, Test No. 1 is a case where a sample is not coated, and it is confirmed that the sample has the lower moisture resistance reliability.

In addition, Test No. 8 is a case where a sample has the coating layer formed on the entire surface of the plating layer so that the surface of the plating layer is not exposed, and it is confirmed that the sample has a weak adhesion strength to be in a non-measurable level, and poor solderability and reliability to be in a non-measurable evaluation level because the capacitor is not soldered.

On the other hand, Test Nos. 2 to 7 are cases where a sample has the coating layer covering the plating layer and including the island region exposing a portion of the surface of the plating layer, and it is confirmed that the sample has moisture resistance reliability more improved than Test No. 1.

Meanwhile, Test Nos. 2 to 4 are cases where a sample has 0.1 to 10% as the range of the ratio of the area of the coating layer and 90 to 99.9% as the range of the ratio of the area of the exposed surface of the plating layer, and it is confirmed that the sample has not only the improved moisture resistance reliability but also the improved adhesion strength and solderability.

As set forth above, the present disclosure may provide the multilayer electronic component having the excellent moisture resistance reliability.

The present disclosure may also provide the multilayer electronic component having both the excellent moisture resistance reliability and mountability.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a plurality of internal electrodes and a dielectric layer interposed between the plurality of internal electrodes;
   external electrodes disposed on the body, connected to the plurality of internal electrodes, and including electrode layers and plating layers respectively covering the electrode layers; and coating layers respectively covering each of the plating layers and including an island region exposing a portion of a surface of the plating layer, wherein 0.5 μm to 5 μm is a range of an average diameter of the island region.

2. The multilayer electronic component of claim 1, wherein 0.1 to 10% is a range of a ratio of an area of the coating layer, which is a ratio of a region where the coating layer is disposed on the surface of the plating layer.

3. The multilayer electronic component of claim 1, wherein 90 to 99.9% is a range of a ratio of an area of the exposed surface of the plating layer.

4. The multilayer electronic component of claim 1, wherein the coating layer includes at least one material selected from the group consisting of aluminum oxide, hafnium oxide, silicon oxide, titanium oxide, zirconium oxide and tin oxide.

5. The multilayer electronic component of claim 1, wherein the coating layer has a multi-layer structure.

6. The multilayer electronic component of claim 1, wherein the coating layer includes a layer in which only a portion of the layer covering the plating layer is removed.

7. The multilayer electronic component of claim 1, wherein 30 nm to 0.2 μm is a range of a thickness of the coating layer.

8. The multilayer electronic component of claim 1, wherein the island region includes a plurality of island regions, and 5 to 10 μm is a range of a shortest distance between the plurality of island regions.

9. The multilayer electronic component of claim 1, wherein the plating layer is a tin (Sn) plating layer.

10. The multilayer electronic component of claim 1, wherein the electrode layer includes a conductive metal and glass.

11. The multilayer electronic component of claim 1, further comprising an additional coating layer disposed on a region of the body, in which the external electrode is not disposed.

12. The multilayer electronic component of claim 11, wherein the additional coating layer covers an entire surface of the region of the body, in which the external electrode is not disposed.

13. A multilayer electronic component comprising:
a body including a plurality of internal electrodes and a dielectric layer interposed between the plurality of internal electrodes;
external electrodes disposed on the body, connected to the plurality of internal electrodes, and including electrode layers and plating layers respectively covering the electrode layers; and
coating layers respectively covering each of the plating layers and including an island region exposing a portion of a surface of the plating layer,
wherein the island region includes a plurality of island regions, and 5 to 10 μm is a range of a shortest distance between the plurality of island regions.

14. The multilayer electronic component of claim 13, wherein the coating layers include an inorganic material.

15. The multilayer electronic component of claim 13, wherein the coating layers include at least one material selected from the group consisting of aluminum oxide, hafnium oxide, silicon oxide, titanium oxide, zirconium oxide, and tin oxide.

16. The multilayer electronic component of claim 15, wherein the at least one material includes aluminum oxide.

* * * * *